United States Patent
Ramesh et al.

(10) Patent No.: US 11,575,775 B2
(45) Date of Patent: Feb. 7, 2023

(54) OVERLAY IP MULTICAST OVER UNICAST IP NETWORKS

(71) Applicant: Extreme Networks, Inc., San Jose, CA (US)

(72) Inventors: Deepak Ramesh, Karnataka (IN); Farook Basha, Andhrapradesh (IN)

(73) Assignee: Extreme Networks, Inc., San Jose, CA (US)

( * ) Notice: Subject to any disclaimer, the term of this patent is extended or adjusted under 35 U.S.C. 154(b) by 507 days.

(21) Appl. No.: 15/398,530

(22) Filed: Jan. 4, 2017

(65) Prior Publication Data

US 2018/0191870 A1    Jul. 5, 2018

(51) Int. Cl.
*H04L 29/06* (2006.01)
*H04L 69/00* (2022.01)
*H04L 12/18* (2006.01)

(52) U.S. Cl.
CPC .......... *H04L 69/03* (2013.01); *H04L 12/1881* (2013.01); *H04L 12/1886* (2013.01); *H04L 12/185* (2013.01)

(58) Field of Classification Search
CPC . H04L 69/03; H04L 12/1881; H04L 12/1886; H04L 12/185
See application file for complete search history.

(56) References Cited

U.S. PATENT DOCUMENTS

| | | | | |
|---|---|---|---|---|
| 7,447,203 B2* | 11/2008 | Chen | ................... | H04L 65/4076 370/389 |
| 7,640,333 B1* | 12/2009 | Fernandez | ............ | H04L 12/185 709/220 |
| 8,179,891 B2* | 5/2012 | Rachwalski | ............ | H04L 12/18 370/230 |
| 8,204,055 B2* | 6/2012 | Bichot | ................ | H04L 12/1836 370/218 |

(Continued)

FOREIGN PATENT DOCUMENTS

EP    2 200 220    6/2010

OTHER PUBLICATIONS

International Search Report and Written Opinion for Application No. PCT/US 2017/068518, dated Mar. 26, 2018 (14 pages).

*Primary Examiner* — Huy D Vu
*Assistant Examiner* — Bailor C Hsu
(74) *Attorney, Agent, or Firm* — Sterne, Kessler, Goldstein & Fox P.L.L.C.

(57) ABSTRACT

Implementations generally relate to data transmission in networks. In some implementations, a method includes receiving a first management protocol message from a first edge device, where the first management protocol message includes first edge device information associated with the first edge device, receiver device information associated with a receiver device, and a request by the receiver device to receive multicast data. The method also includes receiving a second management protocol message from a second edge device, where the second management protocol mes- (Continued)

sage includes second edge device information associated with the second edge device and sender device information associated with a sender device. The method also includes enabling unicast communication between the sender device and the receiver device based on the first management protocol message and the second management protocol message.

20 Claims, 3 Drawing Sheets

(56) References Cited

U.S. PATENT DOCUMENTS

| | | | | |
|---|---|---|---|---|
| 8,537,816 | B2* | 9/2013 | Anumala | H04L 12/1886 370/389 |
| 8,699,352 | B2* | 4/2014 | Moreman | H04L 45/16 370/241 |
| 8,776,256 | B2* | 7/2014 | Nguyen | G06F 21/10 726/27 |
| 9,008,118 | B2* | 4/2015 | Han | H04L 12/4633 370/389 |
| 9,338,769 | B1* | 5/2016 | Naim | H04W 72/12 |
| 9,571,609 | B2* | 2/2017 | Glasser | H04L 67/42 |
| 9,794,180 | B2* | 10/2017 | Thoria | H04L 12/4633 |
| 9,871,666 | B2* | 1/2018 | Hennig | H04L 69/08 |
| 10,033,539 | B1* | 7/2018 | Nagarajan | H04L 12/185 |
| 10,079,694 | B2* | 9/2018 | Hari | H04L 12/4679 |
| 10,200,825 | B2* | 2/2019 | Kathuria | H04W 4/06 |
| 2002/0143951 | A1* | 10/2002 | Khan | H04L 65/612 709/227 |
| 2005/0249233 | A1* | 11/2005 | Akaba | H04L 12/42 370/432 |
| 2008/0107018 | A1* | 5/2008 | Zhang | H04L 45/28 370/228 |
| 2009/0016253 | A1* | 1/2009 | Lewis | H04L 12/1836 370/312 |
| 2010/0265946 | A1* | 10/2010 | Huang | H04N 21/64322 370/390 |
| 2011/0228769 | A1* | 9/2011 | Haimi-Cohen | H04L 12/18 725/114 |
| 2012/0106347 | A1* | 5/2012 | Allan | H04L 47/125 370/238 |
| 2012/0243536 | A1* | 9/2012 | Fernandez Gutierrez | H04L 12/1886 370/390 |
| 2013/0322443 | A1* | 12/2013 | Dunbar | H04L 12/185 370/390 |
| 2014/0364115 | A1* | 12/2014 | Fidler | H04W 36/0033 455/432.1 |
| 2014/0365621 | A1* | 12/2014 | Vieira | H04L 41/0213 709/220 |
| 2015/0023242 | A1* | 1/2015 | Sato | H04L 12/1877 370/312 |
| 2015/0327024 | A1 | 11/2015 | Yang et al. | |
| 2015/0334019 | A1* | 11/2015 | Saito | H04L 45/745 709/238 |
| 2016/0285641 | A1 | 9/2016 | He et al. | |
| 2017/0033939 | A1* | 2/2017 | Bragg | H04L 12/18 |
| 2017/0078188 | A1* | 3/2017 | Allan | H04L 12/4633 |
| 2017/0272359 | A1* | 9/2017 | Behringer | H04L 47/4641 |
| 2017/0353382 | A1* | 12/2017 | Gupta | H04L 45/28 |
| 2018/0183697 | A1* | 6/2018 | Dhesikan | H04L 45/16 |

* cited by examiner

OVERLAY IP MULTICAST OVER UNICAST IP NETWORKS

BACKGROUND

Communication networks are widely used to provide communication between different computer systems and other electronic devices. Internet protocol (IP) packets can be sent from a device to a single recipient on a network using unicast transmission, or to a group of recipients on a network using multicast transmission. Multicast-based devices use special address assignments for simultaneously broadcasting IP packets to a large number of devices. Protocol-independent multicast (PIM) PIM and Internet group management protocol (IGMP) are a family of multicast routing protocols for IP networks that provide one-to-many and many-to-many data distribution over a local area network (LAN), wide area network (WAN) or other networks such as the Internet.

SUMMARY

Implementations generally relate to data transmission in networks. In some implementations, a method includes receiving a first management protocol message from a first edge device, where the first management protocol message includes first edge device information associated with the first edge device, receiver device information associated with a receiver device, and a request by the receiver device to receive multicast data. The method also includes receiving a second management protocol message from a second edge device, where the second management protocol message includes second edge device information associated with the second edge device and sender device information associated with a sender device. The method also includes enabling unicast communication between the sender device and the receiver device based on the first management protocol message and the second management protocol message.

With further regard to the method, in some implementations, the request is to receive multicast data from the sender device, where the request includes an identifier of the sender device. In some implementations, the second management protocol message is received when the second edge device receives multicast data from the sender device. In some implementations, the enabling of unicast communication between the sender device and the receiver device includes sending the receiver device information to the second edge device, where the receiver device information enables the second edge device to send the multicast data in unicast packets to the receiver device. In some implementations, the enabling of unicast communication between the sender device and the receiver device includes sending the sender device information to the first edge device, where the sender device information enables the first edge device to receive the multicast data in unicast packets from the sender device. In some implementations, the method further includes sending multicast database information to each of the first edge device and the second edge device, where the first edge device and the second edge device exchange the multicast data based on the multicast database information. In some implementations, the method further includes applying a policy for directing multicast data.

In some embodiments, a computer-readable storage medium carries one or more sequences of instructions thereon. When executed by one or more processors, the instructions cause the one or more processors to perform operations including receiving a first management protocol message from a first edge device, where the first management protocol message includes first edge device information associated with the first edge device, receiver device information associated with a receiver device, and a request by the receiver device to receive multicast data, and wherein the receiver device information includes a join request; receiving a second management protocol message from a second edge device, where the second management protocol message includes second edge device information associated with the second edge device and sender device information associated with a sender device, and wherein the sender device information includes a join request; and enabling unicast communication between the sender device and the receiver device based on the first management protocol message and the second management protocol message.

With further regard to the computer-readable storage medium, in some implementations, the request is to receive multicast data from the sender device, where the request includes an identifier of the sender device. In some implementations, the second management protocol message is received when the second edge device receives multicast data from the sender device. In some implementations, to enable unicast communication between the sender device and the receiver device, the instructions further cause the one or more processors to perform operations including sending the receiver device information to the second edge device, where the receiver device information enables the second edge device to send the multicast data in unicast packets to the receiver device. In some implementations, to enable unicast communication between the sender device and the receiver device, the instructions further cause the one or more processors to perform operations including sending the sender device information to the first edge device, where the sender device information enables the first edge device to receive the multicast data in unicast packets from the sender device. In some implementations, the instructions further cause the one or more processors to perform operations including sending multicast database information to each of the first edge device and the second edge device, where the first edge device and the second edge device exchange multicast data based on the multicast database information. In some implementations, the instructions further cause the one or more processors to perform operations including applying a policy for directing the multicast data.

In some implementations, a system includes one or more processors, and includes logic encoded in one or more non-transitory computer-readable storage media for execution by the one or more processors. When executed, the logic is operable to perform operations including receiving a first management protocol message from a first edge device, where the first management protocol message includes first edge device information associated with the first edge device, receiver device information associated with a receiver device, and a request by the receiver device to receive multicast data; receiving a second management protocol message from a second edge device, where the second management protocol message includes second edge device information associated with the second edge device and sender device information associated with a sender device; and enabling unicast communication between the sender device and the receiver device based on the first management protocol message and the second management protocol message.

With further regard to the system, in some implementations, the request is to receive multicast data from the sender device, where the request includes an identifier of the sender device. In some implementations, the second management protocol message is received when the second edge device receives multicast data from the sender device. In some implementations, to enable unicast communication between the sender device and the receiver device, the logic when executed is further operable to perform operations including sending the receiver device information to the second edge device, where the receiver device information enables the second edge device to send the multicast data in unicast packets to the receiver device. In some implementations, to enable unicast communication between the sender device and the receiver device, the logic when executed is further operable to perform operations including sending the sender device information to the first edge device, where the sender device information enables the first edge device to receive the multicast data in unicast packets from the sender device. In some implementations, the logic when executed is further operable to perform operations including sending multicast database information to each of the first edge device and the second edge device, where the first edge device and the second edge device exchange the multicast data based on the multicast database information.

A further understanding of the nature and the advantages of particular implementations disclosed herein may be realized by reference of the remaining portions of the specification and the attached drawings.

DETAILED DESCRIPTION

Figure 1:
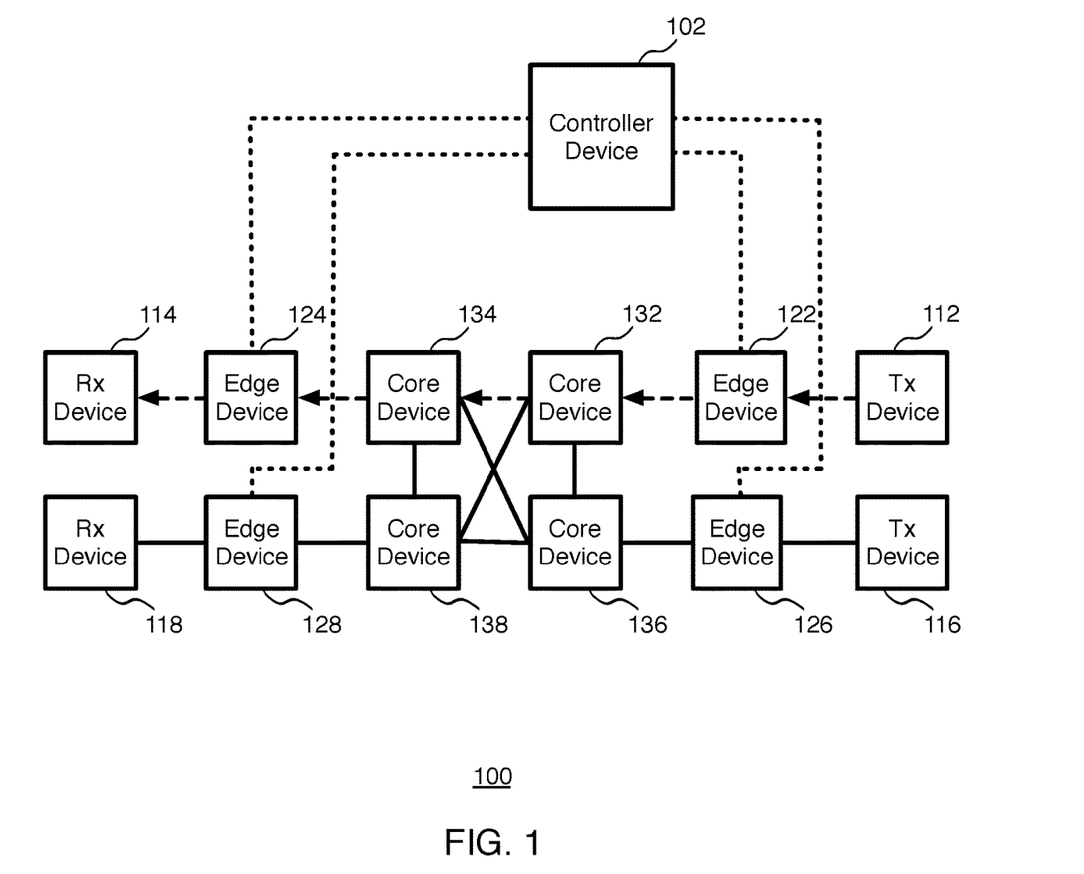
FIG. 1 illustrates a block diagram depicting an example network environment, according to some implementations.

Implementations described herein relate to data transmission in networks. Implementations facilitate packet switching and routing of multicast data in a network using a unicast protocol. In some implementations, a controller device receives a management protocol message from a first edge device, where the first management protocol message includes device information associated with the first edge device, device information associated with a receiver device, and a request by the receiver device to receive multicast data from a particular sender device. The controller device also receives a management protocol message from a second edge device, where the second management protocol message includes device information associated with the second edge device and sender device information associated with the particular sender device. As described in more detail herein, the controller device enables unicast communication between the sender device and the receiver device based on the first management protocol message and the second management protocol message FIG. 1 is a block diagram of an example network system 100, according to some implementations. As shown, network system 100 includes a controller device 102, a sender device 112 (labeled "Tx Device"), and a receiver device 114 (labeled "Rx Device"). In various implementations, controller device 102 is a software-defined networking (SDN) controller device that manages flow control based on protocols in order to enable intelligent networking and direct IP packets. Controller device 102 includes one or more processors and a memory. Controller device 102 maintains a secure communication channel such as secure shell (SSH) with all sender and receiver devices to transmit and receive control information from such.

As described in more detail herein, controller device 102 enables sender device 112 to send multicast data to receiver device 114 (and/or any other receiver device) based on a unicast protocol. Network system 100 also includes a sender device 116 (labeled "Tx Device") and a receiver device 118 (labeled "Rx Device"). Similarly, controller device 102 enables sender device 116 to send multicast data to receiver device 118 (and/or any other receiver device) based on a unicast protocol.

Network system 100 also includes an edge device 122, an edge device 124, an edge device 126, and an edge device 128. Each of the edge devices 122-128 may include one or more processors and a memory. As described in more detail herein, edge devices 122, 124, 126, and 128 transmit information based on a unicast protocol. In various implementations, edge devices 122, 124, 126, and 128 are hardware (HW) virtual extensible local area network (VXLAN) tunnel endpoints (VTEPs). As such, edge devices 122, 124, 126, and 128 may also be referred to as HW VTEPs 122, 124, 126, and 128. In various implementations, edge devices 122, 124, 126, and 128 each establish out-of-band channels to controller device 102, and use both unicast and multicast protocols. Out of band channel may be an SSH session between controller device 102 and an edge device.

Network system 100 also includes a core device 132, a core device 134, a core device 136, and a core device 138. Each of the core devices 132-138 may include one or more processors and a memory. As described in more detail herein, core devices 132, 134, 136, and 138 transmit information based on a unicast protocol and a multicast protocol. In some implementations, multicast routing protocols such as PIM operate in overlay mode with an underlying unicast routing protocol such as open shortest path first (OSPF). The unicast protocol and the multicast protocol may also be referred to as unicast protocol and multicast protocol layers, respectively. As described in more detail herein, implementations enable multicast data to be sent using unicast protocols, thereby eliminating the need for the multicast layer.

Software applications stored in memories or computer-readable storage mediums of the devices described in FIG. 1 provide instructions that enable respective processors to perform functions and other functions described herein. In various implementations, these devices may be implemented as dedicated hardware, e.g., application-specific integrated circuits (ASICs), etc., reconfigurable hardware, e.g., field-programmable gate arrays (FPGAs), etc., general purpose hardware, e.g., microprocessors, microcontrollers, etc. that can execute software instructions.

Although some implementations are described herein in the context of one controller device, four sender devices, four receiver devices, four edge devices, and four core devices, one of ordinary skill in the art will readily recognize that there may be any number of controller devices, sender devices, receiver devices, edge devices, and core devices in a network system. In various implementations, network system 100 may not have all of the components shown and/or may have other elements including other types of components instead of, or in addition to, those shown herein.

In various implementations, network system 100 may include any type of network that connects devices, such as a LAN, WAN, wireless network, or others types of networks. Any one or more networking standards may be used for network system 100, such as Ethernet, common wireless networking standards, e.g., 802.11 standards, etc.

In various implementations, sender devices 112 and 116, and receiver devices 114 and 118 are client devices. These client devices are operated by users and communicate with other client devices as well as other devices via network system 100. The client devices may include wireless transmitters and receivers (e.g., transceivers, radios, etc.) that allow them to communicate signals wirelessly with other devices that also have this capability. Each client device may be any of a variety of types of devices. For example, in some implementations, sender devices 112 and 116 may be implemented as cameras, or any other electronic devices that transmit data. In some implementations, receiver devices 114 and 118 may be implemented as desktop computers, laptop computers, tablet computers, portable devices, cell phones, media players, wearable devices (e.g., glasses device, wristwatch device, etc.), entertainment devices (e.g., television, disc player, stereo, etc.), mainframe computer, peripherals (e.g., printer, scanner, sensors, etc.), Internet-of-things devices or appliances (e.g., thermostats, smart locks, fire alarms, refrigerators, etc.), or other electronic devices, etc.

In various implementations, edge devices 122, 124, 126, and 128 may be wireless access points that enable wireless-capable devices to connect to network system 100 and communicate with each other. Edge devices 122, 124, 126, and 128 may transmit and receive wireless communication signals with sender devices 112 and 116, and receiver devices 114 and 118 via one or more wireless protocols. Some examples of current suitable wireless protocols include those protocols defined under IEEE 802.11, such as multicast and unicast protocols. Other protocols can also be used.

In various implementations, as indicated herein, edge devices 122, 124, 126, and 128 are connected to other network devices provided in network system 100, and communicate data traffic to and from client devices such as sender devices 112 and 116, and receiver devices 114 and 118 through the network via core devices 132, 134, 136, and 138.

Any of a variety of different wireless network topologies, devices, and functions can be used. For example, in some implementations, multiple virtual local area networks (VLANs) can be provided, which provide partitions for client devices connected to network system 100 into distinct domains that are isolated from each other. Some implementations can provide communication between VLANs using mobility switches. For example, edge devices 122, 124, 126, and 128 may be connected (e.g., via wired connection such as Ethernet or wirelessly) to core devices 132, 134, 136, and 138, which may implement mobility tunnels. Such mobility tunnels allow client devices to communicate via particular VLANs associated with particular edge devices 122, 124, 126, and 128 with which the client devices are communicating. Various implementations can include different kinds of switches, hubs, routers, and other types of network devices in the network system 100.

In various implementations, controller device 102 functions to manage, control, and/or configure edge devices 122, 124, 126, and 128, core devices 132, 134, 136, and 138, VLANs, and/or other network devices or structures connected to the network system 100. In some implementations, multiple controller devices may be used, where each controller device may be associated with a different VLAN and/or set of edge devices (e.g., wireless access points, etc.). In some examples, if a client device communicates with an edge device that is associated with controller device 102, and the client device then roams to communicate with a different edge device associated with another controller device, controller device 102 may provide information (e.g., about the client device and its communication with the edge device associated with controller device 102, etc.) to the other controller device to maintain the client connection.

In some implementations, the controller device 102 configures edge devices 122, 124, 126, and 128 with changed or new functionality. For example, controller device 102 may send (or cause to be sent) a firmware image or other software image or code as an upgrade to one or more selected edge devices 122, 124, 126, and 128. Controller device 102 may also select or apply particular settings or functions on edge devices 122, 124, 126, and 128 or other devices connected to the network. Controller device 102 also receives information from connected devices including edge devices 122, 124, 126, and 128, such as status information regarding the settings and status of various functions of edge devices 122, 124, 126, and 128 (e.g., data communication, transmission, reception, readiness, etc.). In some implementations, communication between controller device 102 and edge devices 122, 124, 126, and 128 may be provided on dedicated control connections, where the dedicated control connections may be separate from connections used to transmit client data traffic between edge devices 122, 124, 126, and 128 and any given VLANs. In some implementations, controller device 102 may communicate with edge devices 122, 124, 126, and 128 via connections instead of or in addition to communication over dedicated control connections. Controller device 102 may also communicate control information to core devices 132, 134, 136, and 138 or to any other mobility switches via control connections.

In some implementations, configuration for edge devices 122, 124, 126, and 128 may be defined by controller device 102. For example, edge device profiles stored by controller device 102 may be used to define the access point configuration for different edge devices. Edge devices 122, 124, 126, and 128 may be configured according to the received configuration from controller device 102 such as a set of configuration instructions.

In various example implementations, the configuration can include a software upgrade as described above. The upgrade image can be stored on storage local to the associated controller device 102 or can be stored on one or more separate servers in communication with edge devices 122, 124, 126, and 128. For example, a given edge device may download a software image from a server using a standard protocol such as hypertext transfer protocol (HTTP), file transfer protocol (FTP), trivial file transfer protocol (TFTP), etc. The upgrade image may be controlled and triggered by an edge device, such that controller device 102 sends a request to the edge device to download and install the software image. For example, the edge device may save the received software image in a non-volatile memory partition. After the edge device has downloaded the image, it restarts (e.g., reboots) to initialize and operate with the new image.

In some implementations, the restart can be triggered by a command from controller device, which allows decoupling of the download activity from the restart activity of the access point. For example, a restart can be triggered after all of the access points targeted for the upgrade have indicated that they have successfully downloaded the software image. After restart, the access point can go through a discovery procedure to find and establish a connection with controller device 102. At that point, the edge device is ready to service client data traffic. In some other types of configurations, the edge device can receive new parameters, such as new radio parameters, from controller device 102 or from another device connected to network system 100. Applying some of these parameters may also require the edge device to restart and re-associate with controller device 102.

An administrator device (not shown) may connect to controller device 102 to communicate with controller device 102. For example, the administrator device may receive status information regarding controller device 102 and/or network system 100. The administrator device may also manage network system 100 by sending commands and data to various network devices such as controller device 102 to configure the controller and/or configure other devices connected to network system 100 via controller device 102. An administrator or other user operating the administrator device, for example, can send a command to cause a configuration of designated access points as described above. The administrator device may be connected to network system 100 via any type of network connection. For example, in some implementations, a wireless management service can use a web-based front end to provide a user access to the network.

Figure 2:
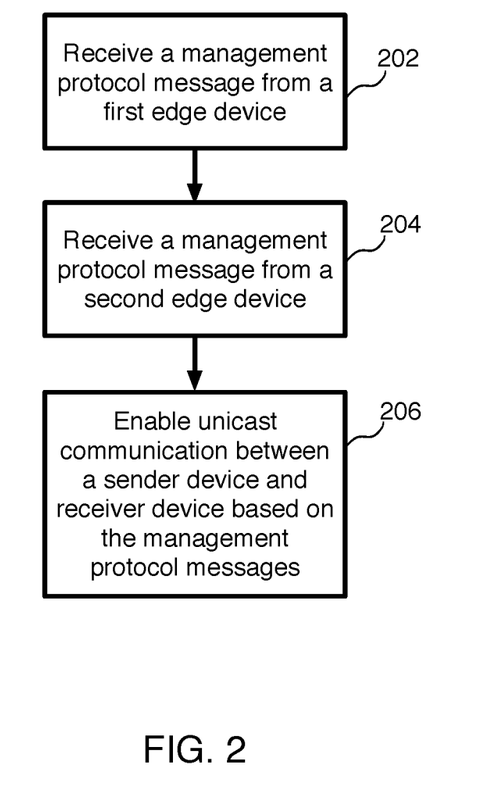
FIG. 2 illustrates an example flow diagram for transmitting messages in networks, according to some implementations.

FIG. 2 illustrates an example flow diagram for transmitting messages, according to some implementations. As described in more detail herein, controller device 102 enables a sender device (e.g., sender device 112) to send multicast data to a receiver device (e.g., receiver device 114) based on a unicast communication protocol. In various implementations, each edge device (or HW VTEP) shares IP multicast information via messages to controller device 102. In various implementations, IP multicast traffic is controlled by controller device 102. Also, in some implementations, multicast traffic may be segmented using a VXLAN Network Identifier (VNID) as needed.

Referring to both FIGS. 1 and 2, a method is initiated in block 202, where controller device 102 receives a management protocol message from edge device 124. In some implementations, communication between controller device 102 and edge devices 122-128 occurs over a dedicated management line (indicated by dotted lines in FIG. 1). In some implementations, communication between controller device 102 and edge devices 122-128 occurs over regular communication lines.

In various implementations, receiver device 114 sends an internet group management protocol (IGMP) join request and multicast information to edge device 124, at which point edge device 124 sends the management protocol message to controller device 102. In various implementations, the management protocol message includes IP multicast information, and controller device 102 and edge device 124 exchange information based on open vswitch database (OVSDB), which is a management communication protocol in an SDN environment. In some implementations, controller device 102 and edge device 124 may also exchange information based on mechanisms such as network configuration protocol (NETCONF) or any other proprietary or nonproprietary client/server protocols. In other words, OVSDB is a main communication protocol between controller device 102 and edge devices 122, 124, 126, and 128. In some implementations, the management protocol message includes edge device information associated with edge device 124, receiver device information associated with receiver device 114, and a request by receiver device 114 to receive multicast data. For example, the edge device information associated with edge device 124 may include a unicast IP address (e.g., 1.1.1.1, etc.) and a network (e.g., VNID-100, etc.). The receiver device information associated with receiver device 114 may include a join request including a multicast IP group address to join (e.g., 226.0.0.1, etc.). In this example implementation, the request provided by receiver device 114 is to receive multicast data from sender device 112. In some implementations, the request provided by receiver device 114 is to receive multicast data from sender device 112 using a unicast protocol.

In this particular example implementation, the management protocol message sent by edge device 124 includes receiver device information associated with receiver device 114, because edge device 124 is coupled to receiver device 114, and edge device 124 received the request from receiver device 114. In some implementations, edge device 124 may also send to controller device 102 management protocol messages containing receiver device information associated with other receiver devices (e.g., receiver device 118) if coupled to such other receiver devices and having received requests from such receiver devices.

In block 204, controller device 102 receives a management protocol message from edge device 122. In various implementations, sender device 112 sends an IGMP join request and multicast information to edge device 122, at which point edge device 122 sends the management protocol message to controller device 102. In various implementations, the management protocol message is IP multicast information, and controller device 102 and edge device 122 exchange information based on OVSDB. In some implementations, the management protocol message includes edge device information associated with edge device 122 and sender device information associated with sender device 112. For example, the edge device information associated with edge device 122 may include a unicast IP address (e.g., 3.3.3.3, etc.) and a network (e.g., VNID-300, etc.). The sender device information associated with sender device 112 may include a join request including a multicast IP group address to join (e.g., 226.0.0.1, etc.). In various implementations, edge device 122 sends the management protocol message in response to edge device 122 receiving multicast data traffic from sender device 112. As such, the management protocol message from edge device 122 is received by controller device 102 when edge device 122 receives multicast data from sender device 112.

In this particular example implementation, the management protocol message sent by edge device 122 includes sender device information associated with sender device 112, because edge device 122 is coupled to sender device 112, and edge device 122 received multicast data from sender device 112. In some implementations, edge device 122 may also send to controller device 102 management protocol messages containing sender device information associated with other sender devices (e.g., sender device 116) if coupled to such other sender devices and having received multicast data from such sender devices.

In block 206, controller device 102 enables unicast communication between sender device 112 and receiver device 114 (indicated by dotted lines in FIG. 2) based on the management protocol messages from edge device 124 and the management protocol message from edge device 122. In various implementations, to enable unicast communication between sender device 112 and receiver device 114, controller device 102 sends or pushes the receiver device information associated with receiver device 114 to edge device 122. In various implementations, edge device 122 maintains the receiver device information in a multicast database and forwards multicast traffic based on its multicast database. The receiver device information enables edge device 122 to send the multicast data in unicast packets to receiver device 114, via edge device 124.

Furthermore, in various implementations, to enable unicast communication between sender device 112 and receiver device 114, controller device 102 sends or pushes the sender device information associated with sender device 112 to edge device 124. In various implementations, edge device 124 maintains the sender device information in a multicast database and receives multicast traffic based on its multicast database. The sender device information enables edge device 124 to receive the multicast data in unicast packets from sender device 112, which is then sent to receiver device 114.

In various implementations, controller device 102 sends multicast database information to each of edge device 124 and edge device 122, where edge device 124 and edge device 122 exchange multicast data based on the multicast database information. In various implementations, as indicated herein, each of edge device 124 and edge device 122 maintains a multicast database and exchanges multicast data based on the multicast database. In some implementations, the multicast database holds information about how many unicast copies need to be made and to which edge devices unicast copies should be sent. In some implementations, multiple unicast copies will be made and sent to each of the edge devices that have sent an IGMP join message for that sender. If the IGMP joins messages are not received within a user-specified time interval at the edge device, the edge device then informs controller device 102 via OVSDB. Controller device 102 then informs other edge devices to stop sending traffic to that particular receiver.

In various implementations, controller device 102 causes edge device 122 to encapsulate multicast data with a unicast header based on the multicast database information. For example, data packets from sender device 112 are encapsulated with unicast information. For example, edge device 122 encapsulates the data packets with a VXLAN header, which uses unicast IP addresses. As such, implementations use a unicast protocol to handle multicast traffic, thereby eliminating the need for a multicast layer at the core devices.

In various implementations, all IP multicast traffic is controlled by controller device 102. Also, multicast traffic may be segmented using the VXLAN VNID identifier as needed. In various implementations, controller device 102 applies a policy for directing multicast data to one or more receiver devices. In some implementations, controller device 102 may send policies to edge devices in order to control and/or restrict multicast data from flowing to particular client devices such as receiver device 114. For example, controller device 102 may apply a policy where receiver device 118 is restricted from receiving multicast data from sender device 112. Such policies may allow reception of data by authorized users and deny reception of data to unauthorized users, for example. In various implementations, these policies may be user defined to allow any granularity and criteria that is decided by user.

In some implementations, controller device 102 may cause a particular edge device such as edge device 122 to make a predetermined number of copies (head-end replication) of the multicast data for unicast transmission. In some implementations, the number of copies may be based on a number of receiver devices that are to receive the multicast data. For example, if three receiver devices request to receive the multicast data, the edge device connected to the sender device may make three copies of the multicast data. The edge device may then send each copy of the multicast data to respective receiver devices using a unicast protocol. As indicated herein, such receiver devices have received an IGMP join for the corresponding sender device, wherein the IGMP join enables the receiver devices to received data streams from the sender device. In indicated herein, in various implementations, the multicast data is transmitted as unicast packets via the core devices.

Because core 102 causes multicast data to be transmitted based on a unicast protocol, implementations need not use a PIM protocol in the underlay network of the IP core (e.g., in core devices 132, 134, 136, and 138), thereby avoiding multicast traffic and thus avoiding complex multicast protocols in the IP core. Avoiding such multicast traffic in the IP core selectively blocks traffic streams (e.g., multicast traffic streams) on both edge backbone bridges such as edge devices 122, 124, 126, and 128 and core backbone bridges such as core devices 132, 134, 136, and 138 in a network. Such networks may include shortest path bridging media access control (SPBM) networks based on layer-2 parameters such as source and destination intermediate system-to-intermediate system (ISIS) MAC-addresses and service (ISID) information.

By using edge devices 122, 124, 126, and 128 at the edge of network system 100, IP multicast sender traffic is head-end (edge device) replicated to all receiver devices. In other words, edge devices make copies of multicast data for the receiver devices, one copy for each receiver device. Core devices 132, 134, 136, and 138 are used for unicast traffic. Also, convergence time is improved, because controller device 102 uses existing unicast routing protocol timing without additional multicast timing. In various implementations, convergence time is the time required for the packets to get rerouted to new path if the current path between sender and receiver goes down. Implementations are interoperable based on OVSDB and IGMP protocols. Convergence time is same as or comparable to that of the unicast protocol convergence time. Implementations support multicast in both multiple instances of virtual routing and forwarding (VRF) and global routing table (GRT) contexts. Head end replication (HER) is applied to edge devices connected to receiver devices. By sending unicast packets, the core devices can make use of equal cost multiple path (ECMP) hashing mechanisms to load balance the traffic across all available paths, thereby allowing the traffic to traverse faster. This makes system 100 more flexible and efficient from bandwidth use perspective.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
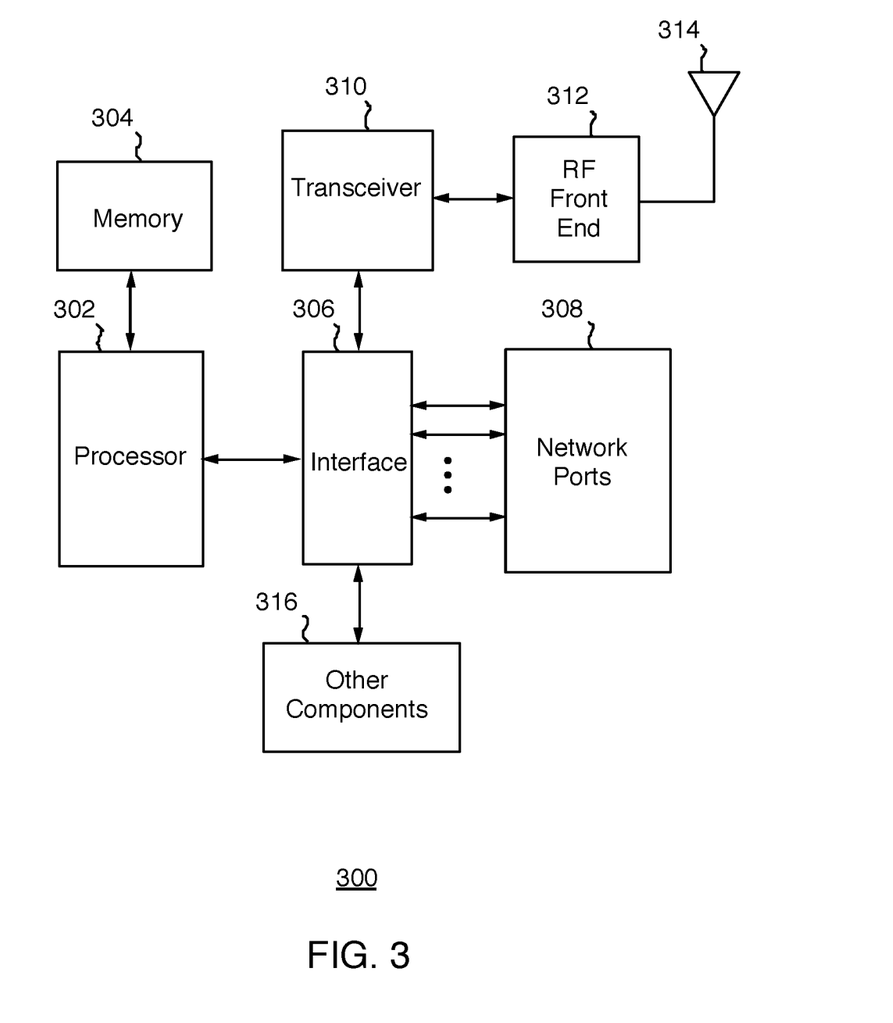
FIG. 3 illustrates a block diagram of an example device, according to some implementations.

FIG. 3 illustrates a block diagram of an example device 300, according to some implementations. Device 300 may be used for various implementations described herein. Device 300 may be, for example, a wireless controller or SDN controller or controller device 102 as shown in the example of FIG. 1, or other type of network device such as sender devices 112 and 116, receiver devices 114 and 118, edge devices 122, 124, 126, and 128, and core devices 132, 134, 136, and 138, etc. In an example configuration, device 300 includes a processor 302 and a memory 304.

Depending on the desired configuration, processor 302 may be of any type of processing circuitry including but not limited to one or more microprocessors, microcontrollers, digital signal processors (DSPs), field-programmable gate arrays (FPGAs), application specific integrated circuits (ASICs), or any combination thereof In some examples, processor 302 may include one or more levels of caching, a processor core, and registers. An example processor core may include an arithmetic logic unit (ALU), a floating-point unit (FPU), a digital signal processing core (DSP), or any combination thereof. A memory controller can also be used with processor 302, or, in some implementations, a memory controller can be an internal part of processor 302.

Memory 304 may store data used in the operation of the device 300. For example, an example implementation, device 300 may be a controller device, and system memory 304 may store an operating system for the controller device, one or more applications for the controller device, and program data. In some implementations, memory 304 may store software operative to perform network device functionality as well as read the instructions sent by an administrator or other user to the device and perform other functions as described above, including reading and executing commands and parameters, receiving information from associated wireless access points, and performing blocks of methods described herein using one or more processors. For example, edge device profiles providing configurations for edge devices, and/or software images and/or parameters for sending to be installed on edge devices may be stored in memory 304. Furthermore, a signal coverage map can be stored in memory 304 representing the wireless coverage of associated edge devices in the network. Alternatively, the software may be implemented as hardware or a combination of hardware and software. Memory 304 may be implemented as one or more of various types, volatile and/or non-volatile, including random access memory (RAM), read-only memory (ROM), electrically erasable programmable read-only memory (EEPROM), flash memory or other memory technology, etc.

An interface 306 may be used to interface processor 302 with other functional components of the device 300. Such other components may include network ports 308 of device 300, where network ports 308 are connected to other devices on the network to enable communication of data to and from other network devices. For example, Ethernet, universal serial bus (USB), or other types of ports may allow wired network communication to device 300.

A transceiver 310 may be connected to interface 306 to enable transmission and reception of wireless signals at device 300. For example, a radio frequency (RF) front end 312 and an antenna 314 may enable transmission and reception of wireless RF signals, as well as conversion between analog signals used in wireless communication and digital signals used by device 300. Signals of other frequencies may be communicated in other implementations.

Other components 316 may also be connected to interface 306. For example, storage devices may be connected to interface 306, such as a compact disc ROM (CD-ROM), digital video disc (DVD), or other optical storage, magnetic tape storage, magnetic disk storage or other magnetic storage devices, solid state memory storage, or any other medium which can be used to store the desired information and which can be accessed by device 300. Any such computer storage media (including memory 304) may be part of or accessible by device 300. Example computer storage media can include volatile and nonvolatile, removable and non-removable media implemented in any method or technology for storage of information, such as computer readable instructions, data structures, program modules, or other data.

In various implementations, device 300 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

In general, it should be understood that the circuits described herein may be implemented in hardware using integrated circuit development technologies, or via some other methods, or the combination of hardware and software that could be ordered, parameterized, and connected in a software environment to implement different functions described herein. For example, the embodiments may be implemented using a general purpose or dedicated processor running a software application through volatile or non-volatile memory. Also, the hardware elements may communicate using electrical signals, with states of the electrical signals representing different data. It should be further understood that this and other arrangements described herein are for the purposes of example only. As such, those skilled in the art will appreciate that other arrangements and other elements (e.g., machines, interfaces, functions, orderings, and groupings of functions, etc.) may be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural terms and/or singular term herein, those having ordinary skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those skilled in the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those of ordinary skill in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense that one having ordinary skill in the art would understand the convention (e.g., " a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Any suitable programming language may be used to implement the routines of particular embodiments including C, C++, Java, assembly language, etc. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable non-transitory processor-readable storage medium, such as random-access memory (RAM), read-only memory (ROM), magnetic or optical disk, or other tangible media suitable for storing instructions for execution by the processor.

Particular embodiments may be implemented by using a programmable general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art.

Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
   receiving, by a controller device, a first management protocol message from a first edge device, wherein the first management protocol message includes first edge device information associated with the first edge device, receiver device information associated with a receiver device coupled to the first edge device, and a request by the receiver device to receive multicast data using a unicast protocol and wherein the first edge device information comprises a first unicast address associated with the first edge device;
   receiving, by the controller device, a second management protocol message from a second edge device, wherein the second management protocol message includes second edge device information associated with the second edge device and sender device information associated with a sender device coupled to the second edge device and wherein the second edge device information comprises a second unicast address associated with the second edge device;
   sending, by the controller device, the receiver device information to the second edge device;
   sending, by the controller device, the sender device information to the first edge device; and
   enabling, by the controller device, unicast communication of the multicast data, using the unicast protocol, over a shortest path bridging media access control (SPBM) network based on layer-2 parameters between the sender device and the receiver device based on the first management protocol message and the second management protocol message.

2. The method of claim 1, wherein the request is to receive the multicast data from the sender device, wherein the request comprises a multicast group address, and wherein the sender device information comprises the multicast group address.

3. The method of claim 1, wherein the second management protocol message is received in response to the second edge device receiving the multicast data from the sender device.

4. The method of claim 1, wherein:
   the receiver device information enables the second edge device to send the multicast data in unicast packets to the receiver device, and
   the sender device information enables the first edge device to receive the multicast data in the unicast packets from the sender device.

5. The method of claim 1, wherein:
   receiving the first management protocol message from the first edge device comprises receiving the first management protocol message based on a network configuration protocol (NETCONF), and
   receiving the second management protocol message from the second edge device comprises receiving the second management protocol message based on the NETCONF.

6. The method of claim 1, wherein sending the receiver device information to the second edge device and sending the sender device information to the first edge device comprises:
   sending multicast database information to each of the first edge device and the second edge device, wherein the first edge device and the second edge device exchange the multicast data based on the multicast database information.

7. The method of claim 1, wherein the enabling unicast communication comprises enabling the second edge device to encapsulate the multicast data with a unicast header based on multicast database information.

8. The method of claim 1, further comprising:
   providing, to a controller device associated with the third edge device, the receiver device information associated with the receiver device in response to the receiver device roaming to communicate with the third edge device associated with the controller device.

9. A non-transitory computer-readable storage medium carrying program instructions thereon, the instructions, when executed by one or more processors of a controller device, cause the one or more processors to perform operations comprising:
   receiving a first management protocol message from a first edge device, wherein the first management protocol message includes first edge device information associated with the first edge device, receiver device information associated with a receiver device coupled to the first edge device, and a request by the receiver device to receive multicast data using a unicast protocol, wherein the receiver device information includes a join request, and wherein the first edge device information comprises a first unicast address associated with the first edge device;
   receiving a second management protocol message from a second edge device, wherein the second management protocol message includes second edge device information associated with the second edge device and sender device information associated with a sender device coupled to the second edge device, wherein the sender device information includes a join request, and wherein the second edge device information comprises a second unicast address associated with the second edge device;
   sending the receiver device information to the second edge device;
   sending the sender device information to the first edge device; and
   enabling unicast communication of the multicast data, using the unicast protocol, over a shortest path bridging media access control (SPBM) network based on layer-2 parameters between the sender device and the receiver device based on the first management protocol message and the second management protocol message,
   wherein the first and second edge devices comprise hardware (HW) virtual extensible local area network (VXLAN) tunnel endpoints (VTEPs) coupled to the controller device using out of band channels.

10. The computer-readable storage medium of claim 9, wherein the request is to receive the multicast data from the sender device, wherein the request comprises a multicast group address, and wherein the sender device information comprises the multicast group address.

11. The computer-readable storage medium of claim 9, wherein the second management protocol message is received in response to the second edge device receiving the multicast data from the sender device.

12. The computer-readable storage medium of claim 9, wherein the receiver device information enables the second edge device to send the multicast data in unicast packets to the receiver device.

13. The computer-readable storage medium of claim 9, wherein the sender device information enables the first edge device to receive the multicast data in unicast packets from the sender device.

14. The computer-readable storage medium of claim 9, wherein to send the receiver device information to the second edge device and to send the sender device information to the first edge device the instructions cause the one or more processors to perform operations comprising sending multicast database information to each of the first edge device and the second edge device, wherein the first edge device and the second edge device exchange the multicast data based on the multicast database information.

15. A controller device comprising:
one or more processors; and
logic encoded in one or more non-transitory computer-readable storage media for execution by the one or more processors and when executed are operable to perform operations comprising:
receiving a first management protocol message from a first edge device, wherein the first management protocol message includes first edge device information associated with the first edge device, receiver device information associated with a receiver device coupled to the first edge device, and a request by the receiver device to receive multicast data using a unicast protocol and wherein the first edge device information comprises a first unicast address associated with the first edge device;
receiving a second management protocol message from a second edge device, wherein the second management protocol message includes second edge device information associated with the second edge device and sender device information associated with a sender device coupled to the second edge device and wherein the second edge device information comprises a second unicast address associated with the second edge device;
sending the receiver device information to the second edge device;
sending the sender device information to the first edge device; and
enabling unicast communication of the multicast data, using the unicast protocol, over a shortest path bridging media access control (SPBM) network based on layer-2 parameters between the sender device and the receiver device based on the first management protocol message and the second management protocol message,
wherein the first and second edge devices comprise hardware (HW) virtual extensible local area network (VXLAN) tunnel endpoints (VTEPs) coupled to the controller device using out of band channels.

16. The controller device of claim 15, wherein the request is to receive the multicast data from the sender device, wherein the request comprises a multicast group address, and wherein the sender device information comprises the multicast group address.

17. The controller device of claim 15, wherein the second management protocol message is received in response to the second edge device receiving the multicast data from the sender device.

18. The controller device of claim 15, wherein the receiver device information enables the second edge device to send the multicast data in unicast packets to the receiver device.

19. The controller device of claim 15, wherein the sender device information enables the first edge device to receive the multicast data in unicast packets from the sender device.

20. The controller device of claim 15, wherein to send the receiver device information to the second edge device and to send the sender device information to the first edge device the logic when executed is further operable to perform operations comprising sending multicast database information to each of the first edge device and the second edge device, wherein the first edge device and the second edge device exchange the multicast data based on the multicast database information, and wherein the multicast database information further includes information on a number of unicast copies of the multicast data to be made.

* * * * *